United States Patent
Wu et al.

(10) Patent No.: US 12,199,443 B2
(45) Date of Patent: Jan. 14, 2025

(54) METHOD FOR CONTROLLING A POWER PLANT WITH A SYNCHRONOUS CONDENSER, AND POWER PLANT

(71) Applicant: VESTAS WIND SYSTEMS A/S, Aarhus N (DK)

(72) Inventors: Dan Wu, The Hague (NL); Mads Rajczyk Skjelmose, Risskov (DK); Kouroush Nayebi, Ikast (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 18/718,374

(22) PCT Filed: Oct. 31, 2022

(86) PCT No.: PCT/DK2022/050228
§ 371 (c)(1),
(2) Date: Jun. 10, 2024

(87) PCT Pub. No.: WO2023/104264
PCT Pub. Date: Jun. 15, 2023

(65) Prior Publication Data
US 2024/0421602 A1 Dec. 19, 2024

(30) Foreign Application Priority Data
Dec. 9, 2021 (DK) .............................. PA202170605

(51) Int. Cl.
*H02J 3/46* (2006.01)
*H02J 3/00* (2006.01)

(52) U.S. Cl.
CPC ................ *H02J 3/46* (2013.01); *H02J 3/001* (2020.01); *H02J 2300/24* (2020.01); *H02J 2300/28* (2020.01)

(58) Field of Classification Search
CPC ...... H02J 3/46; H02J 3/00; H02J 3/001; H02J 2300/28; H02J 2300/24
See application file for complete search history.

(56) References Cited

U.S. PATENT DOCUMENTS

| | | | |
|---|---|---|---|
| 10,968,891 B2 | 4/2021 | Gupta et al. | |
| 2012/0206260 A1* | 8/2012 | Runkle | G01D 4/004 702/62 |
| 2012/0306277 A1 | 12/2012 | Garcia | |

FOREIGN PATENT DOCUMENTS

| EP | 3511563 A1 | 7/2019 |
|---|---|---|
| WO | 2015058769 A1 | 4/2015 |
| WO | 2017114527 A1 | 7/2017 |

OTHER PUBLICATIONS

Danish Patent and Trademark Office, 1st Technical Examination including The Search Report for Application PA 2021 70605 dated Jun. 9, 2022.

(Continued)

*Primary Examiner* — Robert L Deberadinis
(74) *Attorney, Agent, or Firm* — Patterson + Sheridan, LLP (57) ABSTRACT

The invention relates to a power plant connected to an electrical grid and a method for controlling the power plant. The power plant comprises one or more power generators and at least one synchronous condenser. The power generators may be wind turbine generators, solar photovoltaic elements or other kinds of renewable power generators. During a deviation in frequency on the electrical grid, the synchronous condenser counteracts the frequency deviation, but it may also unintentional supply active power during the frequency event. The control method is controlling the active power supply from the power generators during the frequency events based only on the active power output from the power generators.

14 Claims, 6 Drawing Sheets

(56) References Cited

OTHER PUBLICATIONS

PCT International Search Report and Written Opinion of The International Searching Authority for Application PCT/DK2022/050228 dated Mar. 2, 2023 (Mar. 2, 2023).
Hongyang Zhang et al: "Frequency response improvement with synchronous condenser and power electronics converters", 2017 IEEE 3rd International Future Energy Electronics Conference and ECCE Asia (IFEEC 2017—ECCE Asia), IEEE, Jun. 3, 2017 (Jun. 3, 2017), pp. 1002-1007.
Teleke Set Al: "Dynamic Performance Comparison of Synchronous Condenser and SVC", IEEE Transactions on Power Delivery, IEEE Service Center, New York, NY, US, vol. 23, No. 3, Jul. 1, 2008 (Jul. 1, 2008), pp. 1606-1612.

\* cited by examiner

METHOD FOR CONTROLLING A POWER PLANT WITH A SYNCHRONOUS CONDENSER, AND POWER PLANT

FIELD OF THE INVENTION

The present invention relates to a power plant connected to the electric grid, and a method for controlling the power plant. The power plant comprises one or more power generators and at least one synchronous condenser. The power generators may be wind generators, solar photovoltaic elements or other generators producing renewable energy.

BACKGROUND OF THE INVENTION

The trend for power plants producing renewable energy is towards more hybrid power plants, which can provide active power and reactive power to the electric grid in a more flexible way.

A problem with renewable power plants may be the ability of the power plant to deliver or absorb sufficient reactive power to support the grid. Grid support is normally required according to a grid code. It may therefore be advantageous to include a synchronous condenser in the renewable power plant.

A synchronous condenser is a DC-excited synchronous motor, whose shaft is not connected to anything, but spins freely. Its purpose is not to convert electric power to mechanical power or vice versa, but to adjust conditions on the electric grid in case of a grid instability. Unlike a synchronous generator, a synchronous condenser is not a power source.

By adding a synchronous condenser to the power plant, the kinetic energy stored in the rotor of the synchronous condenser can help stabilize the electric grid by continuously deliver and absorb reactive power to support the voltage of the grid, a synchronous condenser also provides frequency support by delivering and absorbing active power in the form of an inertia response, in addition it provides short circuit power hereby improving the short circuit properties of the grid. One advantage of a synchronous condenser is the amount of reactive and active power delivered or absorbed by the synchronous condenser is self-adjustable and, in principle, only dependent on the mechanical properties of the synchronous condenser.

In case of a frequency event, meaning a deviation in the grid frequency from a frequency predefined by the Transmission System Operator, normally 50 Hz or 60 Hz, a synchronous condenser will provide active power in the form of a inertia response, wherein the active power delivered will be dependent of the rate of change of the frequency.

OBJECT OF THE INVENTION

The present invention is devised on this background and provide an improved power plant and method to control a power plant during a frequency event.

SUMMARY OF THE INVENTION

Thus, the above described object and several other objects are intended to be obtained in a first aspect of the invention by providing a method for controlling a power plant connected to an electrical grid at a point of common coupling, the power plant comprises one or more power generators and at least one synchronous condenser, in response to detection of a frequency event in the electrical grid, the method comprises, determining the one or more power generators active power output supplied to the electrical grid, wherein the power generators active power output supplied to the electrical grid is the difference between a total active power output at, or near, the point of common coupling and the synchronous condensers active power output, determining an internal active power reference for the one or more power generators defining the amount of active power to be delivered by the one or more power generators, wherein the internal active power reference is determined based on the frequency of the electrical grid, and the determined one or more power generators active power output supplied to the electrical grid by the one or more power generators, operating the one or more power generators to output active power in accordance with the internal active power reference.

The invention is particularly, but not exclusively, advantageous for stabilizing the electric grid and obtaining a stabile control of the active power output from the power generators and the power plant during a grid event, where the synchronous condenser provides an active power response.

A further advantage of the invention is that the frequency of the grid recovers faster after a grid event. Due to the instabilities in the electric grid, it takes some time for the frequency to recover after a grid event. The method of the invention ensures the recovery of the grid frequency is occurring faster than in prior art method. Thereby, the method of the invention result in a faster and better frequency support.

The power plant comprises one or more power generators. The power generators may be wind turbine generators, but may also be other kinds of power plants like solar photovoltaic elements, geothermic power generators or any other kind of power plant producing renewable energy. The power plant may be a hybrid power plant comprising two, or more, different kind of power generators, for instance the power plant may both have wind turbines and solar photovoltaic elements.

The power plant comprises at least one synchronous condenser. There may be only one synchronous condenser in the power plant, or there may be two or more synchronous condensers in the power plant.

A synchronous condenser stores energy in the rotor. When the electric grid experiences a drop in frequency, the synchronous condenser releases active power to the electric grid in the form of an inertia response, and when the electric grid experiences an increase in active power, the synchronous condenser absorbs active power from the electric grid in the form of an inertial response. Thereby, the synchronous condenser is stabilizing the electric grid.

The internal active power reference is the amount of power that the power generators must deliver for the power plant to meet the demand from the transmission system operator.

It is to be understood that the synchronous condensers active power output could be negative. In other words, the synchronous condensers can either provide active power or absorb active power. In case the frequency is decreasing, it will provide active power and if the frequency is increasing, it will absorb active power.

The power generators active power output is the difference between the total active power output from the power plant and the synchronous condensers active power output.

The frequency of the electrical grid is constantly monitored, and if the frequency or change of frequency deviates, more than a predefined amount or rate, from a predefined grid frequency or rate, respectively, a frequency event occurs. During a frequency event, the power plant controller controls the active power output of the power plant according to the invention.

When a frequency event occurs in the electrical grid, the synchronous condenser releases or absorbs active power, as explained above. This release or absorption of active power may affect the control of the active power production from the power generators, as it affects the measurement of the total active power output delivered by the power plant at, or near, the point of common coupling.

The active power supply from the synchronous condenser may only be of short duration, but in a typical control method based only on the total active power output; this would have an adverse effect in the control of the power generators, as it would affect the active power reference for the power generators. The method of this invention solves this problem by only using the active power output from the power generators to determine the internal active power reference for the power generators, for instance by subtracting the synchronous condenser active power contribution from the total active power output to calculate the active power output from the power generators and determine the internal active power reference for the power generators.

The total active power output, the power generators active power output and the synchronous condensers active power output are all determined at the point of common coupling. However, the power generators active power output and the synchronous condensers active power output may be measured at another point in the power plant and then adjusted by an expected loss of power between the measuring point and the point of common coupling.

The total active power output may not be measured exactly in the point of common coupling, but in a nearby point, a plant measurement point. This plant measurement point may be near the point of common coupling, and therefore in that case it is not necessary to adjust the measured value of total active power output for losses in the power plant. However, if the plant measurement point is further away from the point of common coupling, possible with components between the plant measurement point and the point of common coupling, the measured total active power output may be adjusted by the expected loss of power.

The internal active power reference is used to operate the one or more power generators to output active power in accordance with the internal active power reference. The internal active power reference is the amount of power that the power generators must deliver, and the amount is distributed between the power generators, so the sum of the power output to be delivered by the power generators corresponds to the internal active power reference. The active power provided by the synchronous condensers is not include in determining the internal active power reference.

According to an embodiment, the method further comprises
  determining the synchronous condensers active power output,
  determining the total active power output supplied to the electrical grid at, or near, the point of common coupling,
  determining the power generators active power output supplied to the electric grid by the one or more power generators based on the difference between the total active power output supplied to the electrical grid and the synchronous condensers active power output.

The power generators active power output may be determined as the difference between the total active power output and the synchronous condensers active power output. The total active power output could be determined by measuring the power output at, or near, the point of common coupling. The power output of the synchronous condenser could be determined by measuring the power output of the synchronous condensers in a point between the synchronous condenser and the point of common coupling, and compensation for a power loss between the measuring point and the point of common coupling.

According to an embodiment, determining the synchronous condensers active power output comprises measuring the active power supplied from the synchronous condensers in a first measuring point.

The first measuring point may be placed between the synchronous condensers and the point of common coupling.

According to an embodiment, determining the synchronous condensers active power output further comprises compensating for losses between the first measuring point and the point of common coupling, so the determined synchronous condensers active power output reflects the synchronous condensers contribution to the total active power output in the point of common coupling.

There may be a power loss between the first measuring point and the point of common coupling. Therefore, the value of the measured active power output from the synchronous condensers in the first measuring point may be compensated by calculating the loss between the first measuring point and the point of common coupling, and subtracting the loss from the measured value to obtain the synchronous condensers active power output in the point of common coupling.

According to an embodiment, determining the power generators active power output supplied to the electrical grid by the one or more power generators comprises measuring the active power supplied by the one or more power generators in a second measuring point.

The second measuring point may be placed between the power generators and the point of common coupling.

According to an embodiment, determining the power generators active power output supplied to the electrical grid by the one or more power generators further comprises compensating for losses between the second measuring point and the point of common coupling, so the determined power generators active power output reflects the power generators contribution to the total active power output in the point of common coupling.

Also from the second measuring point to the point of common coupling, a loss may occur in the active power output supplied by the power generators. Therefore, the value of the measured active power output from the power generators in the second measuring point may be compensated by calculating the loss between the second measuring point and the point of common coupling, and subtracting the loss from the measured value to obtain the power generators active power output in the point of common coupling.

According to an embodiment, the step of determining the power generators active power output delivered from the one or more power generators comprises measuring the active power output for each of the power generators in an individual measuring points for each power generator, adding the active power output for each of the power generators to obtain the power generators active power output delivered from the one or more power generators.

It may also be possible to measure the active power output individually for each power generator. This could be done by measuring at an individual measuring point for each power generator, and then add the measured active power outputs for all the power generators.

According to an embodiment, determining the power generators active power output supplied to the electrical grid by the one or more power generators further comprises compensating for losses between the individual measuring points for each power generator and the point of common coupling, so the determined power generators active power output of the one or more power generators reflects the power generators contribution to the total active power output in the point of common coupling.

Losses may occur in the active power output between the individual measuring points for each power generator and the point of common coupling. The losses depend on the components and cables between the individual measuring points and the point of common coupling. Therefore, losses between each individual measuring point and the point of common coupling may be calculated, and the losses subtracted from the measured values to determine the power generators active power output in the point of common coupling.

According to an embodiment, the one or more power generators comprises at least one wind turbine generator.

According to an embodiment, wherein the one or more power generator comprises at least one solar photovoltaic element and/or at least one geothermic power generator and/or at least one of another renewable power generator.

According to an embodiment, determining the internal active power reference is further based on an external active power reference for the power plant.

The power plant may receive an external active power reference from the Transmission System Operator. The power plant controller may then use the external active power reference to determine the internal active power reference for the power generators. For example by adjusting the internal active power reference by the difference between the external active power reference and the determined power generators active power output.

Alternatively, according to an embodiment the internal active power reference may be based on the difference between the determined power generators active power output and a previous determined power generators active power output. In this case the power plant controller determines the difference between the power generators active power output and the previous determined power generators active power output, and are then changing the internal active power reference with the difference.

According to an embodiment, operating the one or more power generators to output active power in accordance with the internal active power reference comprises determining an active power set point for each of the power generators based on the internal active power reference for the one or more power generators.

When the internal active power reference for the one or more power generators has been determined, then active power set points for each of the power generators can be determined by distributing the required active power to be delivered between the power generators according to well-known standard methods for distribution the required active power to each power generator.

According to an embodiment, a frequency event is a deviation in the electric grid frequency from a predefined frequency value or wherein a frequency event is when the rate of change of the frequency exceeds a predefined rate of change.

The predefined frequency is usually 50 or 60 Hz. A frequency event occurs, when the grid frequency deviates from the predefined frequency. There may be a dead band defining the required size of the deviation to be a frequency event. For instance in case the frequency is 50 Hz there may be a dead band between 49 and 51 Hz, alternatively between 49.5 and 50.5 Hz or similar values in that range. A frequency event only occurs if the electric grid frequency is outside the dead band.

Alternatively, a frequency event occurs if the rate of change of the electric grid frequency exceeds a predefined rate of change, and the synchronous condenser will respond to the rate of change of frequency.

In a second aspect, the invention relates to a power plant connected to an electrical grid at a point of common coupling, the power plant comprises one or more power generators, at least one synchronous condenser and a power plant controller, in response to detection of a frequency event in the electrical grid, the power plant controller is arranged to, determine the one or more power generators active power output supplied to the electrical grid, wherein the power generators active power output supplied to the electrical grid is the difference between a total active power output at, or near, the point of common coupling and the synchronous condensers active power output, determine an internal active power reference for the one or more power generators defining the amount of active power to be delivered by the one or more power generators, wherein the internal active power reference is determined based on the frequency of the electrical grid, and the determined one or more power generators active power output supplied to the electrical grid by the one or more power generators, operate the one or more power generators to output active power in accordance with the internal active power reference.

In a third aspect, the invention relates to a computer program product being adapted to enable a computer system comprising at least one computer having data storage means in connection therewith to control an power plant according to the first or second aspect of the invention, such as a computer program product comprising instructions which, when the program is executed by a computer, cause the computer to carry out the method of first aspect of the invention.

This aspect of the invention is particularly, but not exclusively, advantageous in that the present invention may be accomplished by a computer program product enabling a computer system to carry out the operations of the power plant of the first or second aspect of the invention when down- or uploaded into the computer system. Such a computer program product may be provided on any kind of computer readable medium, or through a network.

The individual aspects of the present invention may each be combined with any of the other aspects. These and other aspects of the invention will be apparent from the following description with reference to the described embodiments.

BRIEF DESCRIPTION OF THE FIGURES

The method and the power plant according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
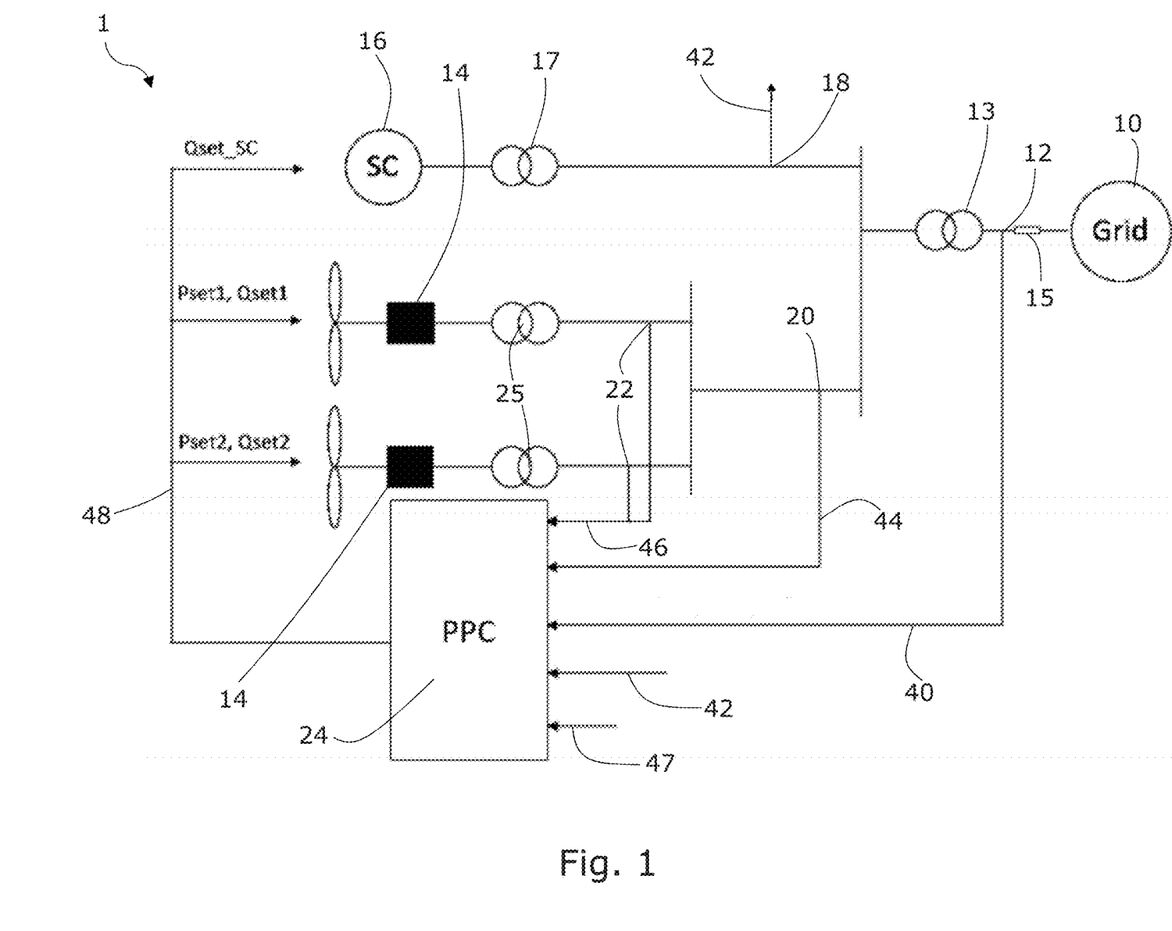
FIG. 1 illustrates the power plant connected to the electrical grid.

FIG. 1 illustrates the power plant 1 connected to the electrical grid 10 at a point of common coupling (PoC) 15. The power plant comprises power generators 14. On FIG. 1 two wind turbines are illustrated, but it could also be solar photovoltaic elements, geothermic power generators or any other kind of renewable power generators. Further, the power plant comprises a synchronous condenser 16. From the synchronous condenser 16 the active power output supplied by the synchronous condensers is measured in the first measuring point 18. The active power output supplied by the power generators may be measured in the second measuring point 20. Alternatively, the active power output for each individual power generator is measured in the individual measuring points 22, and added together to get the active power output supplied by the power generators.

The power plant is controlled by a power plant controller (PCC) 24. The power plant controller 24 is receiving a total active power output 40 measured at the plant measurement point 12. The power plant controller also receives the measured active power output supplied by synchronous condensers 16, measured in the first measurement point 18. The reference 42 illustrates that the measurement is sent from the first measuring point 18 to the power plant controller 24. The power plant controller may also receive the measured active power output 44 supplied by the power generators 14 measured in the second measurement point 20, and/or the measured individual active power outputs 46 supplied by each power generator 14 measured in the individual measurement points 22. Further, the power plant controller 24 is receiving an external active power reference 47 from the Transmission System Operator.

In addition, the power plant controller 24 may receive similar values for reactive power; the reactive power output from the power plant is controlled according to well-known methods including the reactive power supplied by the synchronous condenser.

The power plant controller 24 determines the power generators active power output in the point of common coupling 15, as described for FIGS. 3 and 4a, 4b and 4c.

Between the measurement points 18, 20, 22 and the point of common coupling 15, a loss may occur due to impedance in the power plant between the measurement points and the point of common coupling 15. The losses may be from the cables connecting the measurement points and the point of common coupling 15, and/or the losses may be from components between the measurement points and the point of common coupling 15. FIG. 1 shows a power plant transformer 13 for transforming the internal voltage of the power plant to match the voltage of the grid. Loss may also occur in the transformer. In addition, transformers 25 for each power generator 14 are illustrated in FIG. 1. The synchronous condenser 16 is shown to be connected via a transformer 17.

The power plant controller 24 determines the internal active power reference, and from the internal active power reference, the power plant controller determines set points 48 for the power generators 14 and the synchronous condenser 16. For each power generator both active and reactive set points are determined, and for the synchronous condenser only a reactive set point is determined. The present invention only involves determining the internal active power reference and the active power set points, whereas reactive power set points are determined according to well-known standard methods.

The point of common coupling 15 is the agreed measuring point between the power plant operator and the Transmission System Operator, where the total active power output and electric grid frequency are determined. However, the actual measurements of the total active power output and electric grid frequency may be done in the plant measurement point 12. The point of common coupling 15 is near the plant measurement point 12, so adjustment for the loss between the plant measurement point 12 and the point of common coupling 15 is not necessary in the embodiment illustrated in FIG. 1, even though it can be done, if such a needed.

Figure 2:
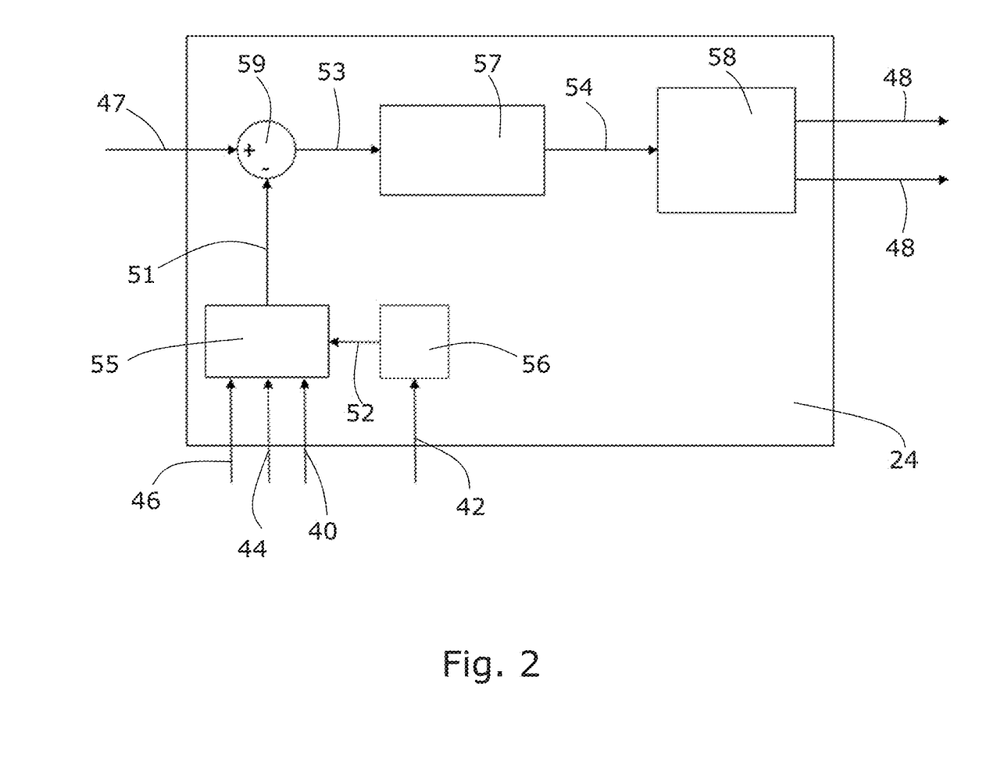
FIG. 2 illustrates the power plant controller.

FIG. 2 illustrates the power plant controller 24. The power plant controller comprises a first function 56 for determining the synchronous condenser active power output 52. This determination is based on the measured active power output of by the synchronous condenser, which is adjusted by the power loss between the first measurement point 18 and the point of common coupling 15.

The power plant controller also comprises a second function 55 for determining the power generators active power output 51. Input for the second function may be the synchronous condenser active power output 52, the total active power output 40, the measured active power output 44 of the power generators, and/or the individual active power outputs 46 of the each individual power generator. The second function 55 determines the power generators active power output 51.

Details, about how the power generators active power output 51 is determined, are illustrated in FIGS. 3, 4a, 4b and 4c.

Further, the external active power reference 47 may be input into the power plant controller 24. The power generators active power output 51 is subtracted, in the subtraction function 59, from the external active power reference 47, and the difference 53 is input to the power controller 57. The power controller 57 determines the internal active power reference 54, which is then send to the power dispatcher 58, which determines the active power set points 48 for each individual power generator. Afterwards the set points are transmitted to the power generators.

Figure 3:
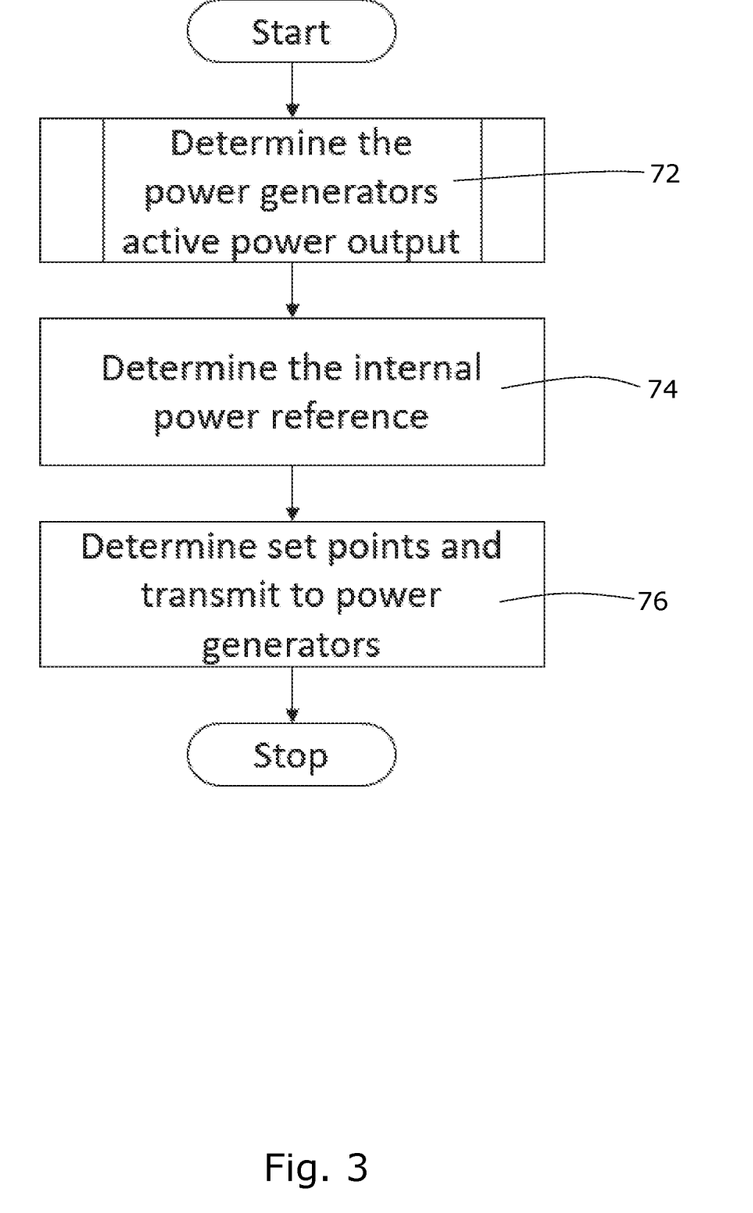
FIG. 3 illustrates the control method of the power plant controller.

FIG. 3 illustrates the control method of the power plant controller. The power plant controller determines the power generators active power output 72, as further described in FIGS. 4a, 4b and 4c. Then the internal active power reference is determined 74. The internal active power reference may be determined by adjusting the previous determined internal active power reference with the difference between the power generators active power output and an external active power reference received from the Transmission System Operator. Then finally, based on the internal active power reference, the active power set points for each power generator are determined and transmitted 76 to the power generators.

Figure 4A:
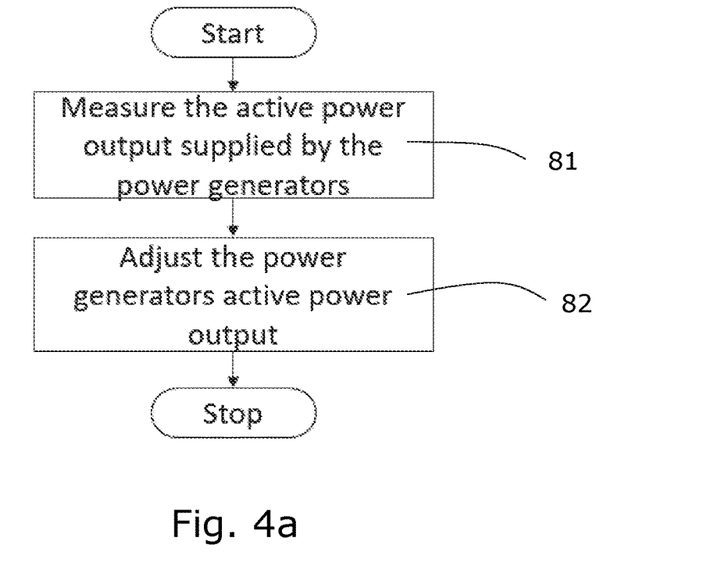
FIG. 4a-4c illustrates different methods for the power plant controller to determine the power generators active power output.
Figure 4B:
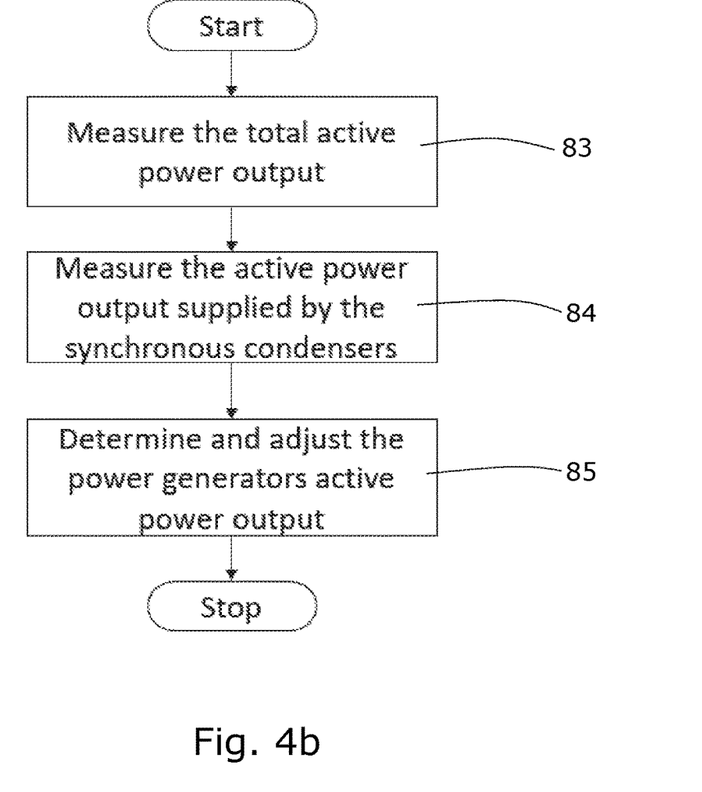
Figure 4C:
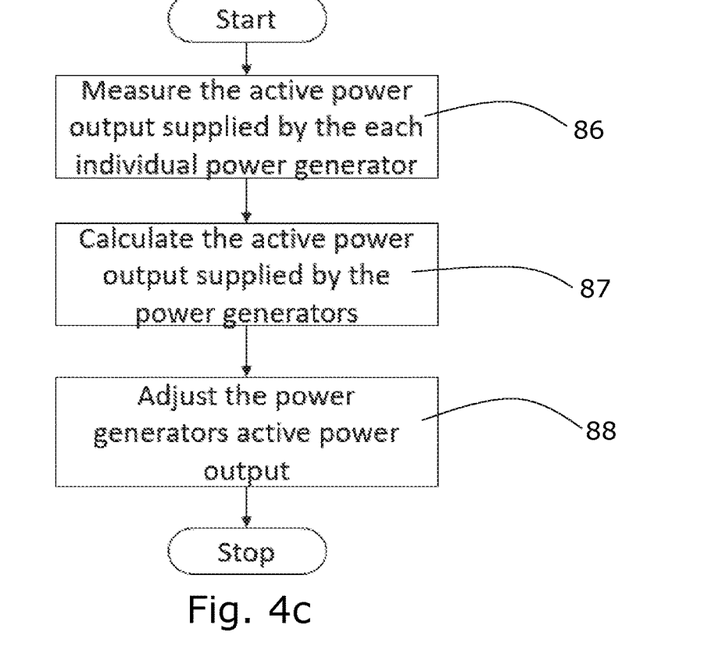

FIGS. 4a, 4b and 4c illustrates different methods for the power plant controller to determine the power generators active power output 51. There are three different methods to do this, depending on which sensors for power measurements are available and used.

FIG. 4a illustrates a first method for determining the power generators active power output 51. First is measured 81 the active power output 44 supplied by the power generators in the second measuring point 20. Then the measured value may be adjusted 82 with the loss between the second measuring point 20 and the point of common coupling 15 to obtain the power generators active power output 51 at the point of common coupling.

FIG. 4b illustrates a second method for determining the power generators active power output 51, wherein the total active power output 40 is determined at, or near, the point of common coupling 15, for example by measuring in the plant measurement point 12. Further, the method measure 84 the active power output 42 supplied by the synchronous condensers in the first measuring point. Then is determined 85 the power generators active power output 51 at the point of common coupling as the difference between the total active power output 40 and the active power output 42 supplied by the synchronous condensers in the first measuring point, adjusting for the loss between the first measuring point 18 and the point of common coupling 15.

FIG. 4c illustrates a third method for determining the power generators active power output 51. The third method involves measuring 86 the individual active power output 46 supplied by each power generator in individual measure points, and then to calculate 87, by summing the measurements for each power generator to get the active power output supplied by all the power generators. This value may be adjusted 88 for the losses between the individual measurement points and the point of measurement to obtain the power generators active power output.

Figure 5:
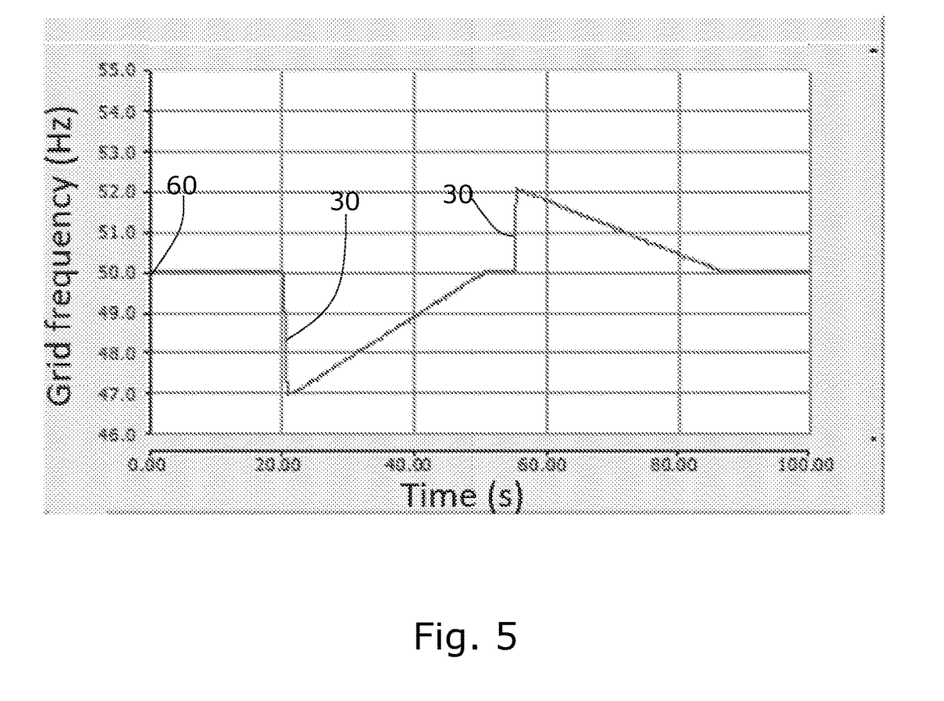
FIG. 5 illustrates frequency events in the electrical grid.

FIG. 5 illustrates frequency events in the electrical grid. The y-axis shows the grid frequency in Hertz (Hz) and the x-axis show the time in seconds. At 20 seconds, the frequency measured from the electrical grid drops from the predefined frequency value 60 of 50 Hz to 47 Hz, thereby a frequency event 30 occurs, and the control method of the invention is activated. The power plant will now provide active power which will help drive the frequency back to 50 Hz. In FIG. 5, after 55 seconds another frequency event 30 occurs, this time it is an increase in the grid frequency when the electric grid frequency increases from 50 to 52.1 Hz, activating the control method of the invention. The power plant will in this case decrease the power output hereby providing support to the grid and helping in getting the frequency back to 50 Hz.

Figure 6:
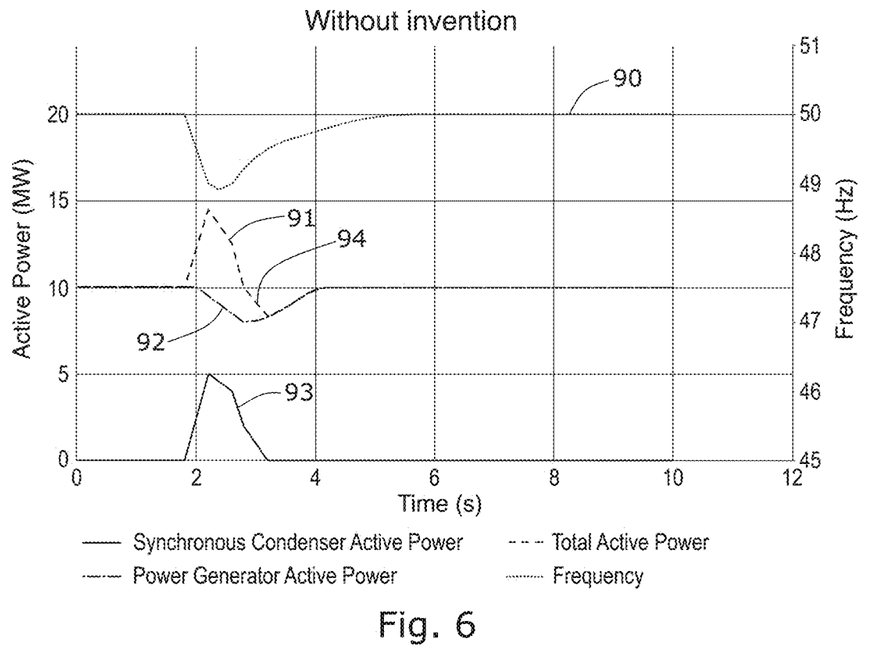
FIG. 6 illustrate a frequency event without using the present invention to control the power production during the frequency event.
Figure 7:
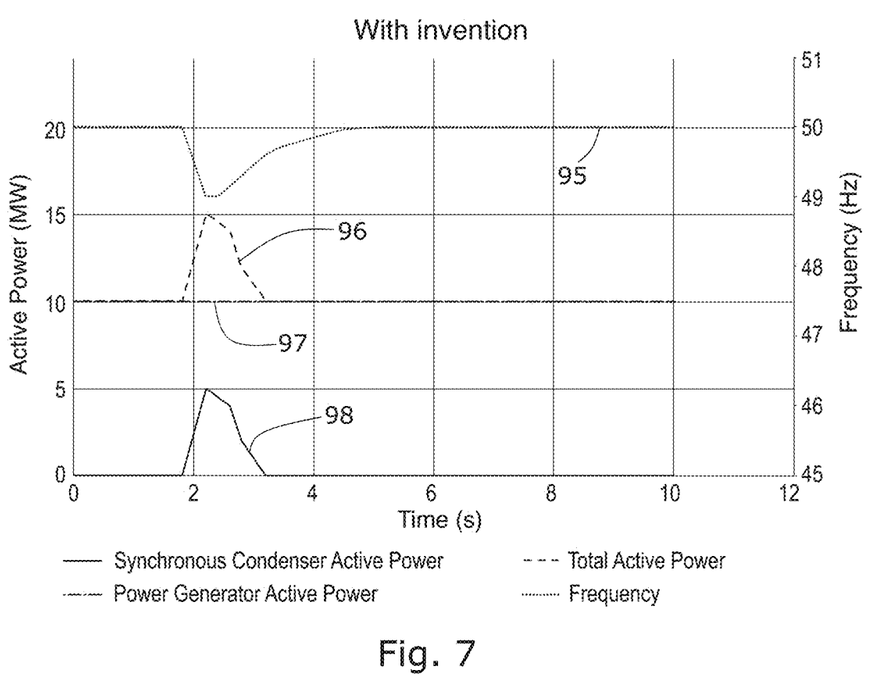
FIG. 7 illustrate a frequency event using the present invention to control the power production during the frequency event.

FIG. 6 illustrate a frequency event without using the present invention to control the power production during the frequency event, and FIG. 7 illustrate a frequency event using the present invention to control the power production during the frequency event.

In FIG. 6, which illustrate the control without using the present invention, the frequency graph 90 shows a frequency event, which occurs after 1.8 seconds, where there is a drop in the grid frequency from 50 Hz to approx. 49 Hz. The synchronous condenser active power graph 93 shows that during the frequency event, the synchronous condenser sends out a boost of active power. This boost from the synchronous condenser causes an increase in total active power output delivered by the power plant. This increase, in a standard control method without using the present invention, makes the power plant controller reduce the internal active power reference for the power generators, and therefore the production of active power by the power generators are reduced as illustrated by the power generators active power graph 92. The total active power graph 91 illustrates the total active power output delivered by the power plant. The graph 91 shows that there is a drop 94 in the active power output after approx. 3 seconds, where the power plant delivers less than the required 10 MW. This drop is caused by decrease of the active power output of the power generators and is a result of the boost from the synchronous condenser. When the power plant controller registers the increased power output from the inertial response from the synchronous condenser it will decrease the power in order to comply with the power reference. When the boost from the synchronous condenser ends and the synchronous condensers active power output falls back to zero, the power generators active power output will return to the level before the frequency event, ex. after a delay.

In FIG. 7, which illustrate the controller using the method of the present invention, the frequency graph 95 shows a frequency event occurring after 1.8 seconds. The synchronous condenser active power graph 98 shows that the synchronous condenser sends out a boost of active power, when the frequency event occurs. This boost from the synchronous condenser causes an increase in total active power output delivered by the power plant, illustrated by the total active power graph 91. As a power plant controller, operating according to the invention, disregards active power delivered by the synchronous condenser, the boost has no effect on the active power output of the power generators as illustrated by the power generators active power graph 97.

Comparing the graphs in FIGS. 6 and 7 shows that when using the control method of the present invention, the power output from the power generators is not affected by the boost from the synchronous condenser. The drop, seen in FIG. 6, in total active power output after approx. 3 seconds, illustrated by the total active power graph 91 in FIG. 6, is not occurring, when the method of the present invention is applied as illustrated by the active power graph 97 in FIG. 7, which do not show a drop in power production.

It can also be seen from comparing FIG. 6 and FIG. 7 that when using the control method of the invention the frequency of the grid recovers faster. In FIG. 7 using the method of this invention, the frequency has recovered before 5.0 seconds on the graph, while when not using the method in the invention in FIG. 6 the frequency has not recovered before 5.5 seconds on the graph. Thereby, the method of the invention does indeed result in a faster and better frequency support.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a power plant connected to an electrical grid at a point of common coupling, the power plant comprises one or more power generators and a synchronous condenser, the method comprises, in response to detection of a frequency event in the electrical grid:
determining an active power output of the one or more power generators supplied to the electrical grid, wherein the active power output of the one or more power generators supplied to the electrical grid is a difference between a total active power output at, or near, the point of common coupling and a power output of the synchronous condenser;
determining an internal active power reference for the one or more power generators defining an amount of active power to be delivered by the one or more power generators, wherein the internal active power reference is determined based on a frequency of the electrical grid and the active power output supplied to the electrical grid by the one or more power generators; and
operating the one or more power generators to output active power in accordance with the internal active power reference.

2. The method according to claim 1, wherein the method further comprises:
determining the active power output of the synchronous condenser;
determining a total active power output supplied to the electrical grid at, or near, the point of common coupling; and
determining the active power output supplied to the electrical grid by the one or more power generators based on the difference between the total active power output supplied to the electrical grid and the power output of the synchronous condenser.

3. The method according to claim 2, wherein determining the active power output of the synchronous condenser comprises measuring an active power supplied from the synchronous condenser in a first measuring point.

4. The method according to claim 3, wherein determining the active power output of the synchronous condenser further comprises compensating for losses between the first measuring point and the point of common coupling so the determined active power output of the synchronous condenser reflects a contribution of the synchronous condenser to the total active power output in the point of common coupling.

5. The method according to claim 1, wherein determining the active power output supplied to the electrical grid by the one or more power generators comprises measuring an active power supplied by the one or more power generators in a second measuring point.

6. The method according to claim 5, wherein determining the active power output supplied to the electrical grid by the one or more power generators further comprises compensating for losses between the second measuring point and the point of common coupling so the determined active power output of the one or more power generators reflects a contribution of the one or more power generators to the total active power output in the point of common coupling.

7. The method according to claim 1, wherein determining the active power output of the one or more power generators comprises measuring the active power output for each of the one or more power generators in an individual measuring point for each of the one or more power generators, adding the active power output for each of the one or more power generators to obtain the active power output of the one or more power generators.

8. The method according to claim 7, wherein determining the active power output of the one or more power generators supplied to the electrical grid further comprises compensating for losses between the individual measuring points for the one or more power generators and the point of common coupling, so the determined active power output of the one or more power generators reflects a contribution of the one or more power generators to the total active power output in the point of common coupling.

9. The method according to claim 1, wherein the one or more power generators comprises at least one wind turbine generator.

10. The method according to claim 1, wherein the one or more power generators comprises at least one solar photovoltaic element or at least one geothermic power generator or at least one of another kind of renewable power generator.

11. The method according to claim 1, wherein determining the internal active power reference is further based on an external active power reference for the power plant.

12. The method according to claim 1, wherein operating the one or more power generators to output active power in accordance with the internal active power reference comprises determining an active power set point for each of the one or more power generators based on the internal active power reference for the one or more power generators.

13. The method according to claim 1, wherein the frequency event is at least one of (i) a deviation in the frequency of the electrical grid from a predefined frequency value or (ii) when a rate of change of the frequency of the electrical grid exceeds a predefined rate of change.

14. A power plant connected to an electrical grid at a point of common coupling, the power plant comprises one or more power generators, a synchronous condenser, and and a power plant controller, the power plant controller is arranged to, in response to detection of a frequency event in the electrical grid:
determine an active power output of the one or more power generators supplied to the electrical grid, wherein the active power output of the one or more power generators supplied to the electrical grid is a difference between a total active power output at, or near, the point of common coupling and an active power output of the synchronous condenser;
determine an internal active power reference for the one or more power generators defining an amount of active power to be delivered by the one or more power generators, wherein the internal active power reference is determined based on a frequency of the electrical grid and the determined active power output of the one or more power generators supplied to the electrical grid; and
operate the one or more power generators to output active power in accordance with the internal active power reference.

\* \* \* \* \*